Figure 1:
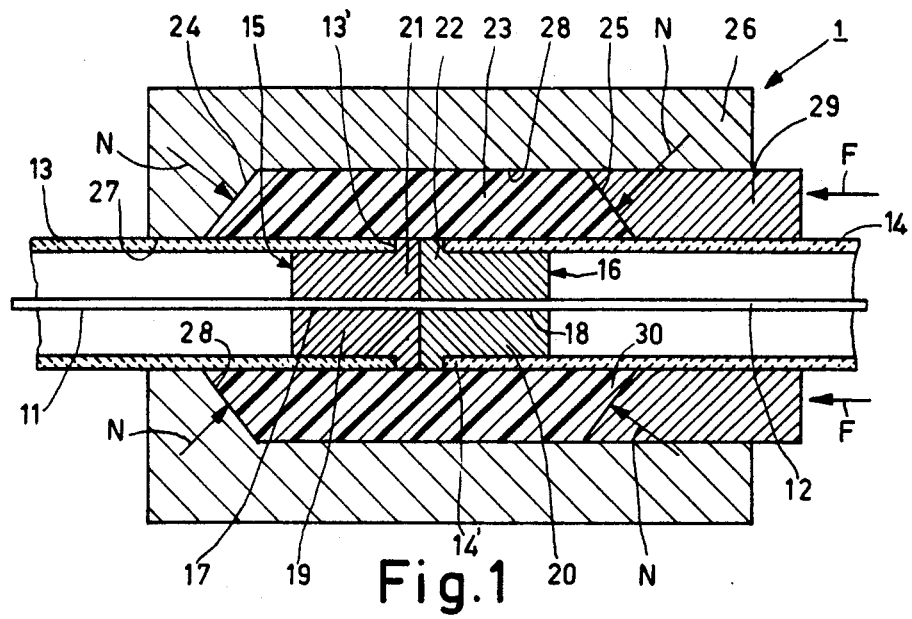

United States Patent

Gousseau

[11] 4,080,044
[45] Mar. 21, 1978

[54] DEVICE FOR COUPLING OPTICAL FIBERS

[75] Inventor: Roland Roger Gousseau, Epinay, France

[73] Assignee: U.S. Philips Corporation, New York, N.Y.

[21] Appl. No.: 628,592

[22] Filed: Nov. 4, 1975

[30] Foreign Application Priority Data

Nov. 18, 1974 France .................. 74 37894

[51] Int. Cl.² .............................................. G02B 5/16
[52] U.S. Cl. ................................................ 350/96.15
[58] Field of Search ............ 350/96 C, 96 R, 96 WG, 350/96 B

[56] References Cited

U.S. PATENT DOCUMENTS

| 3,641,332 | 2/1972 | Reick et al. ............... 350/96 R X |
| 3,734,594 | 5/1973 | Trambarulo ............... 350/96 B |
| 3,883,681 | 5/1975 | Campbell ............... 350/96 C X |
| 3,920,980 | 11/1975 | Nath ............... 350/96 LM X |

Primary Examiner—John K. Corbin
Assistant Examiner—Rolf Hille
Attorney, Agent, or Firm—Frank R. Trifari; Carl P. Steinhauser

[57] ABSTRACT

A device for coupling optical fibers each of which is secured in a capillary tube by means of a cap such that the end of the fiber is situated in one plane with the end face of the cap.

The two capillary tubes are arranged one in the prolongation of the other in the boring of a deformable core which can be deformed such that radial and axial forces are exerted on the capillary tubes, with the result that the latter are simultaneously aligned and secured.

1 Claim, 2 Drawing Figures

DEVICE FOR COUPLING OPTICAL FIBERS

The invention relates to a device for coupling optical fibers.

These fibers are nowadays used for data transmission, the carrier being formed by optical waves of high frequency which pass through the said fibers.

A broad application of this technique is dependent of the possibility of quickly and easily connecting the fibers by means of inexpensive devices.

The present invention satisfies these requirements in all respects. Known devices for coupling optical fibers are described, for example, in U.S. Pat. 3,734,594.

The coupling device described in this Application comprises a deformable core provided with a boring wherein the fibers to be connected are inserted, two pressure plates which are arranged one on each side of the core, and a device which exerts a pressure on the plates which radially deforms the core and simultaneously provides alignment and fixing of the fibers.

A system of this kind has several drawbacks:

on the one hand, mechanical forces are directly exerted on the fibers, which are brittle and liable to break;

on the other hand, during the deformation the core exerts mechanical, mainly radial forces on the surface of the fibers, so that during the fixing the two ends are not axially pressed one against the other, which would benefit the optical coupling;

furthermore, this device does not enable the connection between the two fibers to be controlled and tested during fixing so as to achieve optimum coupling.

The described drawbacks are avoided in the device according to the present invention. The device according to the invention also utilizes a deformable core, but this core does not act directly on the fibers but rather on two jackets which envelop the fibers which are rigidly retained inside the jackets.

Each jacket is formed by a capillary tube which is provided on one end with a rotation-symmetrical cap, the outer diameter thereof being equal to the inner diameter of the capillary tube, the cap being inserted into the latter. The cap is provided with a central opening having a diameter which substantially equals that of the fiber inserted into the said opening and glued therein, the end of the fiber being situated substantially in one radial plane with the end face of the cap.

The two fibers to be coupled, thus enveloped by their jacket and provided with their cap, are arranged one in the prolongation of the other, the deformable core enclosing the abutting portions of the two constructions. The deformable core is retained inside a housing and a pressure is exerted such that by the deformation of the core on each of the capillary tubes a mechanical force is exerted which is parallel to the axis of the two fibers, the two forces being directed towards each other.

The present invention thus relates to a device for coupling optical fibers, characterized in that it comprises for each fiber a capillary tube, means for securing the fiber in the capillary tube, at least one deformable core having a boring of a diameter substantially equal to the outer diameter of the capillary tube, and means for deforming the core in the radial and the axial direction.

The invention also relates to a multiple coupling device wherein the pair-wise coupling of the fibers is performed by means of a device of the kind set forth.

The invention will be described in detail hereinafter with reference to the accompanying drawing.

Figure 2:
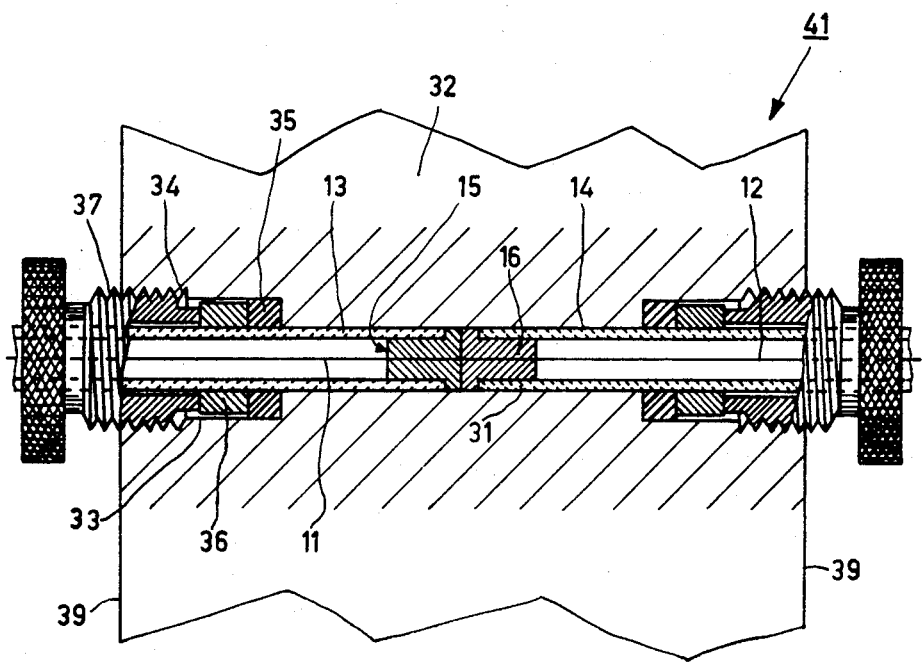

FIG. 1 is a sectional view of a first embodiment of the device according to the invention, and FIG. 2 is a sectional view of a second embodiment of the device according to the invention.

FIG. 1 is a sectional view of a coupling device 1 taken in a plane through the axis of the two fibers 11 and 12 to be coupled. The coupling device is of a rotation-symmetrical construction.

The fibers 11, 12 are inserted into capillary tubes, 13, 14 which are closed by means of caps 15, 16. The caps 15, 16 are provided with a central opening 17, 18 having a diameter substantially equal to that of the fibers.

Each cap comprises two cylindrical portions: a portion 19, 20 having an outer diameter which equals the inner diameter of the capillary tubes 13, 14 and a portion 21, 22 having a diameter which is substantially equal to the outer diameter of the capillary tubes. The portions 19, 20 are inserted into the ends of the capillary tubes, the portions 21, 22 of the caps constituting an abutment for the ends 13', 14' of the capillary tubes. The fibers 11, 12 are secured in the openings 17, 18 by means of glue. The position of the fibers 11, 12 in the openings 17, 18 is such that the fibers are situated in one radial plane together with the end faces of the portions 21, 22.

The two capillary tubes, the caps and the fibers are arranged in a clamping device which has a rotation-symmetrical construction and which comprises the following components:

a deformable cylindrical core 23 of, for example, synthetic material, the inner diameter thereof being equal to the outer diameter of the capillary tubes; this core is arranged over the ends of the capillary tubes 13, 14 and comprises conical faces 24 and 25;

a rigid housing 26 of, for example, metal, having a boring 27 of a diameter which equals that of the capillary tubes and a chamber 27' the circumference of which is complementary to that of the core 23 and which notably comprises a conical wall 28, the top angle thereof being equal to that of the conical face 24 of the core 23, a pressure ring 29 having a conical face 30 which is complementary to the face 25.

An axial force F exerted on the pressure ring 29 results in normal forces N which act on the core 23. Under the influence of these forces, the core 23 is deformed in the radial and the axial direction with respect to the capillary tubes.

The radial components of the normal forces N provide the clamping of the capillary tubes; the axial components which are directed towards each other tend to force the capillary tubes 13 and 14 towards each other and facilitate the contacting of the fibers 11 and 12.

Two phases can be distinguished during coupling:

during a first phase, the axial force F is rather small in order to initiate merely the fixing of the capillary tubes; the capillary tubes with the fibers can then still be rotated with respect to each other so as to achieve optimum coupling;

during a second phase, the force F is increased, so that the capillary tubes are blocked with respect to each other.

It is to be noted that this coupling device is designed such that it is completely sealed against the ingress of liquid or gas.

In the coupling device shown in FIG. 2, the fibers 11 and 12 are also inserted into a jacket which is shaped as a capillary tube 13, 14, provided with a cap 15, 16, respectively.

The components thus formed are mounted into an opening 31 of a housing 32 having parallel faces 39, the axis of the opening 31 being perpendicular to the parallel faces 39.

The opening 31 is provided on each end with a thread 34 and with a cylindrical chamber 33 which has a diameter exceeding the external diameter of the capillary tubes 13, 14.

The chamber 33 accommodates a ring 35 of deformable material which may have a square section as shown in FIG. 2, but which may also have any other shape, for example, a round section. The chamber 33 furthermore accommodates a rigid pressure ring 35 and a screw 37 which has a boring 42 slightly larger than the diameter of the capillary tubes 13, 14.

For securing the capillary tubes, a pressure is exerted on the pressure rings 36 by means of the screws 37, the said pressure being transferred to the deformable rings 35. The rings 35 are deformed in the axial and the radial direction, the capillary tubes 13, 14 with the two fibers then being urged towards each other and ultimately being blocked in the coupled position.

This embodiment also enables the coupling of the two fibers 11 and 12 to be controlled before the ultimate blocking takes place.

This embodiment is particularly suitable for constructing a multiple coupling device. To this end, the housing 32 is formed, for example, by a metal plate comprising a plurality of openings 31, each opening enabling the coupling of two fibers.

What is claimed is:

1. A device for coupling two optical fibers, comprising a pair of capillary tubes each of which surrounds and is spaced from one of said fibers, a cylindrical cap closing one end of each capillary tube and securing each fiber therein, said cap comprising a portion having an outer diameter which substantially equals the inner diameter of said capillary tubes, and a portion having an outer diameter which substantially equals the outer diameter of the capillary tubes, the cap having a boring having a diameter equal to the diameter of the fibers, at least one deformable core surrounding said capillary tubes with their closed ends in abutting relationship having a boring of a diameter which is substantially equal to the external diameter of the capillary tube, a housing having a boring of the same diameter as the outer diameter of the capillary tubes, and a chamber of the same shape as the deformable core, and a slideable pressure ring for deforming the core in the radial and the axial direction.

* * * * *